(12) United States Patent
Fishbeck et al.

(10) Patent No.: US 10,078,759 B1
(45) Date of Patent: *Sep. 18, 2018

(54) SYSTEM AND METHOD FOR DATA SHARING VIA A DATA STRUCTURE HAVING DIFFERENT-SCHEME-DERIVED PORTIONS

(71) Applicant: Griffin Group Global, LLC, Great Falls, VA (US)

(72) Inventors: Jonathan B. Fishbeck, Great Falls, VA (US); William F. Heapes, Barboursville, VA (US); Matthew Jenks, Charlottesville, VA (US)

(73) Assignee: GRIFFIN GROUP GLOBAL, LLC, Great Falls, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,034

(22) Filed: Jan. 19, 2018

(51) Int. Cl.
*G06F 21/62* (2013.01)
*G06F 17/30* (2006.01)
*H04L 9/08* (2006.01)
*G06F 21/60* (2013.01)
*G06N 3/08* (2006.01)
*G06N 3/04* (2006.01)

(52) U.S. Cl.
CPC .... *G06F 21/6227* (2013.01); *G06F 17/30312* (2013.01); *G06F 21/602* (2013.01); *H04L 9/088* (2013.01); *G06F 2221/2107* (2013.01); *G06N 3/04* (2013.01); *G06N 3/08* (2013.01)

(58) Field of Classification Search
CPC .......... G06F 21/6227; G06F 17/30312; G06F 21/602; G06F 2221/2107; H04L 9/088; G06N 3/08; G06N 3/04
See application file for complete search history.

(56) References Cited

U.S. PATENT DOCUMENTS

| | | | | |
|---|---|---|---|---|
| 5,369,702 | A * | 11/1994 | Shanton | G06F 12/1408 340/5.26 |
| 6,598,161 | B1 * | 7/2003 | Kluttz | G06F 21/6209 713/166 |
| 7,921,284 | B1 * | 4/2011 | Kinghorn | G06F 21/6209 713/160 |

(Continued)

FOREIGN PATENT DOCUMENTS

WO     WO 0201271 A1 *   1/2002   ........ G06F 21/6209

*Primary Examiner* — Darren B Schwartz
(74) *Attorney, Agent, or Firm* — Pillsbury Winthrop Shaw Pittman LLP

(57) ABSTRACT

In certain embodiments, a data structure including first and second data structure portions may be obtained, where the first data structure portion is generated based on a first cryptographic scheme, and the second data structure portion is generated based on a second cryptographic scheme. The data structure may be processed to determine the first cryptographic scheme for extracting data from the first data structure portion and the second cryptographic scheme for extracting data from the second data structure portion. In some embodiments, a computer program may use the first cryptographic scheme to decrypt the first data structure portion to extract the first information from the first data structure portion, and the same computer program may use the second cryptographic scheme to decrypt the second data structure portion to extract the second information from the second data structure portion.

20 Claims, 8 Drawing Sheets

(56) References Cited

U.S. PATENT DOCUMENTS

| | | | | |
|---|---|---|---|---|
| 7,930,756 B1* | 4/2011 | Crocker | G06F 21/6209 | 705/57 |
| 8,543,821 B1* | 9/2013 | Gabrielson | H04N 21/23476 | 713/171 |
| 8,621,036 B1* | 12/2013 | L'Heureux | G06F 21/62 | 709/217 |
| 2001/0042124 A1* | 11/2001 | Barron | G06F 12/1408 | 709/227 |
| 2002/0099947 A1* | 7/2002 | Evans | G06F 21/6209 | 713/193 |
| 2003/0110131 A1* | 6/2003 | Alain | G06F 21/6209 | 705/51 |
| 2005/0010760 A1* | 1/2005 | Goh | G16H 10/60 | 713/161 |
| 2005/0025316 A1* | 2/2005 | Pelly | H04N 5/913 | 380/277 |
| 2005/0235163 A1* | 10/2005 | Forlenza | H04L 9/088 | 713/193 |
| 2006/0242064 A1* | 10/2006 | Jogand-Coulomb | G06F 21/10 | 705/50 |
| 2007/0219915 A1* | 9/2007 | Hatano | H04L 9/0825 | 705/57 |
| 2007/0220610 A1* | 9/2007 | Van Loenen | G06F 21/10 | 726/26 |
| 2008/0086757 A1* | 4/2008 | Pestoni | G06F 21/10 | 726/2 |
| 2008/0165958 A1* | 7/2008 | Matsushita | G06F 21/10 | 380/44 |
| 2009/0100268 A1* | 4/2009 | Garcia | G06F 21/6209 | 713/184 |
| 2010/0095118 A1* | 4/2010 | Meka | G06F 21/6227 | 713/168 |
| 2010/0179831 A1* | 7/2010 | Brown | G06Q 10/06 | 705/3 |
| 2010/0235649 A1* | 9/2010 | Jeffries | G06F 21/6209 | 713/189 |
| 2010/0235924 A1* | 9/2010 | Bulot | G16H 10/60 | 726/27 |
| 2011/0040967 A1* | 2/2011 | Waller | G06F 21/10 | 713/161 |
| 2012/0131351 A1* | 5/2012 | Balinsky | H04L 9/0825 | 713/189 |
| 2012/0303967 A1* | 11/2012 | Chia | H04L 9/0822 | 713/189 |
| 2013/0031369 A1* | 1/2013 | Balinsky | H04L 9/088 | 713/176 |
| 2013/0262864 A1* | 10/2013 | Hamid | G06F 21/6218 | 713/165 |
| 2014/0164776 A1* | 6/2014 | Hook | H04L 9/14 | 713/171 |
| 2014/0173282 A1* | 6/2014 | Pascariello | G06F 21/6218 | 713/171 |
| 2017/0093817 A1* | 3/2017 | Khoury | H04L 63/0471 | |
| 2017/0293769 A1* | 10/2017 | Quinlan | G06F 21/6209 | |

* cited by examiner

SYSTEM AND METHOD FOR DATA SHARING VIA A DATA STRUCTURE HAVING DIFFERENT-SCHEME-DERIVED PORTIONS

RELATED APPLICATIONS

This application is related to U.S. patent application Ser. No. 15/876,016, filed on Jan. 19, 2018, entitled "System and Method for Providing a Data Structure Having Different-Scheme-Derived Portions," which is hereby incorporated by reference herein in its entirety.

FIELD OF THE INVENTION

The invention relates to a data structure having different-scheme-derived portions, including, for example, creation of such data structure, use of such data structure to securely share information, etc.

BACKGROUND OF THE INVENTION

Computer systems may facilitate the adoption of software applications that power specific aspects of various businesses. These software applications perform specific tasks allowing one or more individuals and groups to collaborate, perform defined functions, track or retain specific data; however, traditional computer systems may not facilitate sharing data from one application to the next in a highly secure and organized manner. For example, traditional business systems generally rely merely on security of the transmission pipeline and host-based boundary protections (e.g., firewalls) along with traditional role-based or user-based permissions to facilitate data sharing. Such business systems typically require separate downloadable files (or other data structures) for each piece of information that has a different set of permissions (e.g., designating which user can access that piece of information) from other information, thereby increasing the number of downloadable files/data structures to be stored on computers hosting such information. These and other drawbacks exist.

SUMMARY OF THE INVENTION

Aspects of the invention relate to methods, apparatuses, and/or systems for facilitating secure data structures, distribution and security of information, and/or productivity applications and information.

In some embodiments, a data structure (including first and second data structure portions in a body of the data structure) may be obtained, where the first data structure portion is generated based on a first cryptographic scheme, and the second data structure portion is generated based on a second cryptographic scheme. The data structure may be processed to determine the first cryptographic scheme for extracting data from the first data structure portion and the second cryptographic scheme for extracting data from the second data structure portion. In some embodiments, an application may use the first cryptographic scheme to decrypt the first data structure portion to extract the first information from the first data structure portion, and the same application may use the second cryptographic scheme to decrypt the second data structure portion to extract the second information from the second data structure portion. The application may perform the decryption of the first data structure portion and the second data structure portion in parallel or in series.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
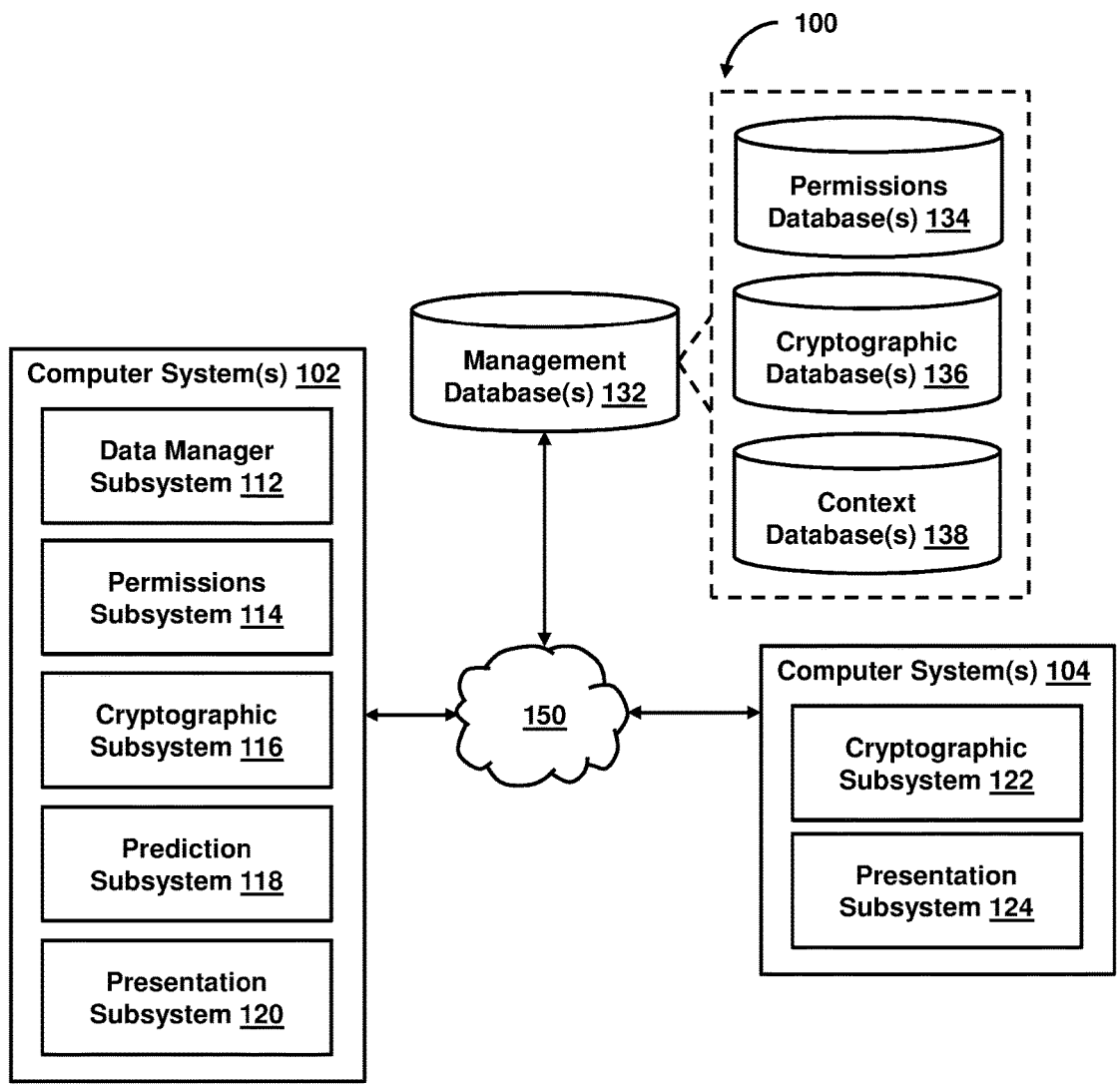
FIG. 1 shows a system for facilitating secure data structures, distribution and security of information, and/or productivity applications and information, in accordance with one or more embodiments.

FIG. 1 shows a system 100 for facilitating secure data structures, distribution and security of information, and/or productivity applications and information, in accordance with one or more embodiments. As shown in FIG. 1, system 100 may include computer system(s) 102, computer system (s) 104, or other components. Computer system 102 may include data manager subsystem 112, permissions subsystem 114, cryptographic subsystem 116, prediction subsystem 118, presentation subsystem 120, or other components. Computer system 104 may include cryptographic subsystem 122, presentation subsystem 124, or other components.

In some embodiments, computer system 102 may be a server-side computer system, and computer system 104 may be a client-side computer system (e.g., one or more client devices). In some embodiments, each of computer system 102 and computer system 104 may be a server-side computer system. In some embodiments, each of computer system 102 and computer system 104 may be a client-side computer system (e.g., a client device). Each client device may include any type of mobile terminal, fixed terminal, or other device. By way of example, a client device may include a desktop computer, a notebook computer, a tablet computer, a smartphone, a wearable device, or other client device. Users may utilize one or more client devices to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of computer system 104. As another example, while one or more operations are described herein as being performed by components of computer system 104, those operations may, in some embodiments, be performed by components of computer system 102.

In some embodiments, system 100 may facilitate secure data structures, distribution and security of information, and/or productivity applications and information. Such data structures may be files, linked lists, arrays, records, or other data structures. In some embodiments, system 100 may generate a data structure that includes a portion representing first information (e.g., text, audio, image, video, program, or other information) to be accessed by a first entity or set of entities, a portion representing second information to be accessed by a second entity or set of entities, or other portions. As an example, entities other than the first entity or set of entities would be prevented from accessing the first information via the data structure even if those other entities gains access to the data structure, and entities other than the second entity or set of entities would be prevented from accessing the second information via the data structure even if those other entities gains access to the data structure. As a further example, even though the first entity may access the first information via the data structure, the first entity may not be able to access the second information via the data structure (or vice versa). In this way, for example, the data structure may be made accessible to a plurality of entities (e.g., including those for which some or all portions of the data structure are not intended) via a web site or other platform without causing the information represented by the data structure to be accessed by entities for which the information is not intended even if some such information is intended for and accessible by the entities via the data structure. Additionally, or alternatively, unnecessary creation of multiple variations of a set of information may be avoided, thereby reducing computational resources related to sharing of such information. For example, system 100 need not necessarily create different variations of the set of information for different sets of entities as different files (or other data structures) to prevent entities of one of the sets of entities from gaining access to information intended only for another one of the sets of entities.

In some embodiments, each of the data structures portions may not itself be a data structure independent of the data structure that includes such portion. As an example, each of the data structure portions may not include header or other information configured to indicate what application(s) or type of application(s) is/are to be used to access (e.g., read, write, execute, etc.) the content of the respective data structure portion or how to process/interpret the content (e.g., how to parse the content or other specifications). As another example, if the data structure is a file, neither the portion representing the first information nor the portion representing the second information may be configured to be its own separate file. In one use case, for instance, the file may include a header and a body, the two portions may be two portions of the file's body, and neither of the two body portions may include its own header (e.g., that a computer program would use to determine how to parse the body portion).

In some embodiments, system 100 may determine one or more cryptographic schemes to be used to generate different portions of a data structure based on permissions associated with the respective information represented by the different data structure portions. Each of the cryptographic schemes may include use of a different cryptographic key (as compared to another cryptographic scheme used to generate another portion of the data structure), use of a different one of a symmetric cryptographic scheme or an asymmetric cryptographic scheme (as compared to another cryptographic scheme used to generate another portion of the data structure), etc.

As an example, as part of providing a data structure that includes representations of first and second information (e.g., first and second content portions), system 100 may obtain a first set of permissions associated with the first information (e.g., to determine what entity or set of entities may access the first information) and a second set of permissions associated with the second information (e.g., to determine what entities or set of entities may access the second information). The first set of permissions may grant write access, read access, execute access, delete access, or other type of access for one or more first entities (or one or more first groups of entities). The second set of permissions may grant write access, read access, execute access, delete access, or other type of access for one or more second entities (or one or more second groups of entities). System 100 may determine a first cryptographic scheme for the first information based on the first set of permissions being associated with the first information and a second cryptographic scheme for the second information based on the second set of permission being associated with the second information. System 100 may then generate a first data structure portion (that represents the first information in the data structure) based on the first cryptographic scheme and a second data structure portion (that represents the second information in the data structure) based on the second cryptographic scheme. System 100 may automatically perform one or more of the obtainment of the permissions, the determination of the cryptographic schemes, the generation of the data structure portions for the data structure, or other operations described herein. As an example, system 100 may perform the obtainment of the permissions without any further user input (i) provided subsequent to system 100 obtaining a request to create the data structure and (ii) specifying the permissions (e.g., any of the permissions, all of the permissions, etc.). As another example, system 100 may perform the determination of the cryptographic schemes and the generation of the data structure portions without any further user input (i) provided subsequent to system 100 obtaining the request to create the data structure and (ii) specifying the cryptographic schemes (e.g., any of the cryptographic schemes, all of the cryptographic schemes, etc.).

In some embodiments, system 100 may cause one or more applications to use different cryptographic schemes to encrypt multiple portions of content (e.g., first information, second information, etc.) to generate the data structure portions of a data structure that respectively correspond to the content portions. For example, upon generation by an application (e.g., a computer program, a mobile application, or other application), a first data structure portion of the data structure may include an encrypted version of a first content portion (e.g., encrypted by the application with a first cryptographic scheme), a second data structure portion of the data structure may include an encrypted version of a second content portion (e.g., encrypted by the application with a second cryptographic scheme different from the first cryptographic scheme), a third data structure portion of the data structure may include an encrypted version of a third content portion (e.g., encrypted by the application with a third cryptographic scheme different from the first and second cryptographic schemes), and so on. As a further example, the first cryptographic scheme may be selected (e.g., by the application or other application for encrypting the first content portion) based on a first set of permission being associated with the first content portion, the second cryptographic scheme may be selected (e.g., by the application or other application for encrypting the second content portion) based on a second set of permission being associated with the second content portion, the third cryptographic scheme may be selected e.g., (by the application or other application for encrypting the third content portion) based on a third set of permission being associated with the first content portion, and so on. In some embodiments, the application may automatically perform one or more of obtainment of the permissions, the determination/selection of the cryptographic schemes, the generation of the data structure portions for the data structure, or other operations described herein. As an example, the application may perform the obtainment of the permissions without any further user input (i) provided subsequent to the application obtaining a request to create the data structure and (ii) specifying the permissions (e.g., any of the permissions, all of the permissions, etc.). As another example, the application may perform the determination/selection of the cryptographic schemes and the generation of the data structure portions without any further user input (i) provided subsequent to the application obtaining the request to create the data structure and (ii) specifying the cryptographic schemes (e.g., any of the cryptographic schemes, all of the cryptographic schemes, etc.). As a further example, the application may perform some or all of the foregoing automatic operations within a short period of time (e.g., the determination/section of the cryptographic schemes and the generation of the data structure portions or other operations within two seconds, within one second, within ten milliseconds, within one millisecond, etc.).

In some embodiments, system 100 may process a data structure having one or more cryptographic-scheme-derived portions to facilitate access to information corresponding to the data structure portions. As an example, responsive to obtaining the data structure, system 100 may process the data structure to determine a first cryptographic scheme for extracting data from a first data structure portion of the data structure and a second cryptographic scheme for extracting data from a second data structure of the data structure. System 100 may obtain first information from the first data structure portion based on the first cryptographic scheme and second information from the second data structure portion based on the second cryptographic scheme. In some embodiments, responsive to a user's request to access at least one of the data structure portions (or the corresponding content portions), system 100 determines which content portions are extractable by the user. As an example, with respect to each of the data structure portions, system 100 determines whether the user is associated with a cryptographic scheme that can be used to decrypt the data structure portion to extract the corresponding content portion. Based on such determination, system 100 may decrypt only the data structure portions that can be decrypted with the user's associated cryptographic schemes (e.g., and ignore the other data structure portions that are only decryptable with cryptographic schemes with which the user is not associated) thereby avoiding unnecessary use of computational resources for attempted decryptions and/or presentation of incorrect data (e.g., resulting from attempt decryptions with incorrect keys). System 100 may automatically perform one or more of the determination of the cryptographic schemes (e.g., including which cryptographic schemes are associated with the user or other related determinations), the obtainment of the information from the data structure portions, or other operations described herein. As an example, system 100 may perform the determination of the cryptographic schemes and the obtainment of the information from the data structure portions without any further user input (i) provided subsequent to system 100 obtaining a request to access at least one of the data structure portions (or the corresponding content portions) and (ii) specifying the cryptographic schemes (e.g., any of the cryptographic schemes, all of the cryptographic schemes, etc.).

In some embodiments, system 100 may cause one or more applications to use different cryptographic schemes to decrypt multiple data structure portions of a data structure to extract portions of content (e.g., first information, second information, etc.) that respectively correspond to the data structure portions. For example, a first data structure portion of the data structure may include an encrypted version of a first content portion, a second data structure portion of the data structure may include an encrypted version of a second content portion, a third data structure portion of the data structure may include an encrypted version of a third content portion, and so on. As a further example, based on a processing of header or other information of the data structure portion (e.g., by an application, such as a mobile application or other application), first, second, and third cryptographic schemes may be selected (e.g., by the application) for decrypting the first, second, and third data structure portions, respectively. In some embodiments, one application (e.g., the same application that selected the cryptographic schemes or other application) may use the selected cryptographic schemes to decrypt the first, second, and third data structure portions to extract the first, second, and third content portions, respectively. In some embodiments, the application may automatically perform one or more of the determination/selection of the cryptographic schemes, the decryption/extraction based on the cryptographic schemes, or other operations described herein. As an example, the application may perform the determination/selection of the cryptographic schemes and the extraction of the content portions without any further user input (i) provided subsequent to the application obtaining a request to access at least one of the data structure portions (or the corresponding content portions) and (ii) specifying the cryptographic schemes (e.g., any of the cryptographic schemes, all of the cryptographic schemes, etc.).

In one use case, the application may read the header or other information of the data structure to determine whether and/or which of the data structure portions corresponds to a content portion intended for the current user of the application. For example, if a given content portion is intended for a user group (e.g., users with a certain role, users with a certain access level, etc.) with which the user is associated, a header or other part of the data structure may indicate that the content portion is intended for the user group (e.g., by specifying the user group's identifier, access level, or other attributes of the user group in association with the data structure portion corresponding to the content portion). The application may determine that the content portion is intended for the user based on its determination that the content portion is intended for the user group and that the user is part of the user group. Based on such determination, the application may obtain a cryptographic key associated with the user group and use the cryptographic key to decrypt the data structure portion (corresponding to the content portion) to extract the content portion from the corresponding data structure portion. As another example, if a given content portion is intended only for the current user, a header or other part of the data structure may specify the user's identifier or other attribute of the user in association with the data structure portion corresponding to the content portion. Based on the specified association, the application may obtain a cryptographic key associated with the user and use the cryptographic key to decrypt the data structure portion (corresponding to the content portion) to extract the content portion from the corresponding data structure portion. In some use cases, one or more cryptographic keys may be stored on the user's client device, and the application may obtain the cryptographic keys from a secure memory of the client device. In some use cases, one or more cryptographic keys may be stored on a server-side computer system (e.g., on behalf of the user), and the application may obtain the cryptographic keys from the server-side computer system (or a database associated therewith).

In some embodiments, system 100 may facilitate prediction-model-based (i) creation of secure data structures, (ii) distribution and security of information, and/or (iii) generation and updating of action items, events (e.g., electronic appointment, meeting invitation, etc., with times, locations, attachments, attendees, etc.), conversations, documents, or other items. The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, system 100 may obtain content items, permissions associated with such content items (or portions thereof), or other training information and cause one or more prediction models to be trained based on the training information to create secure data structures, manage accessibility of information (e.g., by distributing information in such secure data structures, by implementing permission-based access to any and all parts of a file or other data structure, etc.), and/or generate and update content items. As an example, the number of content items (along with their respective permissions) used to train the prediction models may be 500 or more content items (along with their respective permission), 1000 or more content items (along with their respective permissions), 10000 or more content items (along with their respective permissions), 100000 or more content items, 1000000 or more content items (along with their respective permissions), or other number of content items (along with their respective permissions). The content items may include action items, events, conversations, documents, or other items (including text, images, audios, videos, programs, etc., in such items).

Subsystems 112-120

Figure 2A:
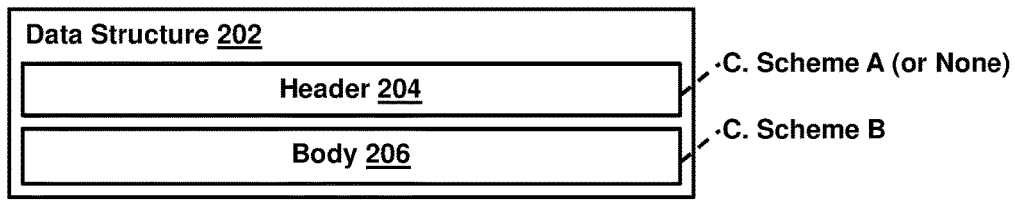
FIGS. 2A-2E show representations of a data structure, a header of a data structure, and a body of a data structure, in accordance with one or more embodiments.
Figure 2B:
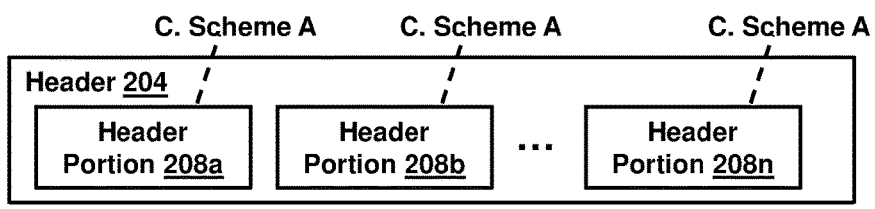
Figure 2C:
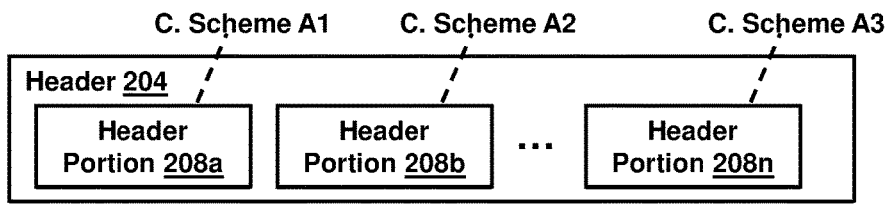
Figure 2D:
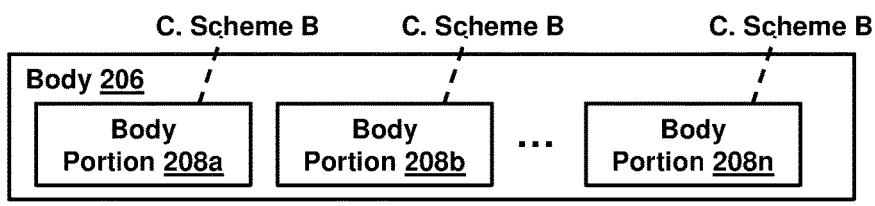
Figure 2E:
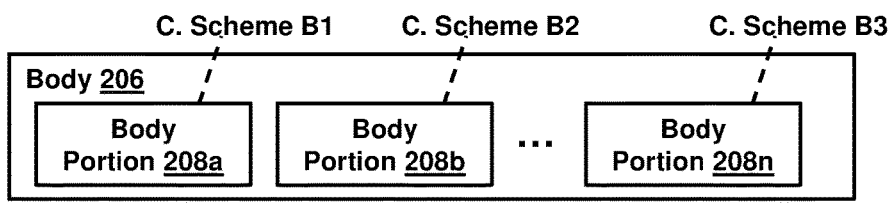

In some embodiments, data manager subsystem 112 is configured to obtain information to be represented in a data structure accessible to a plurality of entities, and cryptographic subsystem 116 is configured to determine one or more cryptographic schemes for the information to generate one or more data structure portions for the data structure. As an example, data manager subsystem 112 may obtain first information, second information, or other information (e.g., first portion of content, second portion of content, etc.) to be respectively represented in a first data structure portion, a second data structure portion, or other data structure portion of the data structure. In some embodiments, the data structure may include a file, linked list, array, record, or other data structure, and the file, linked list, array, record, or other data structure may include the first and second data structure portions (or other data structure portions). In some embodiments, data manager subsystem 112 is configured to provide the data structure (including the first and second data structure portions) such that the data structure is accessible to one or more entities. In one use case, as shown in FIG. 2A, data structure 202 may include header 204 and body 206, where a non-encrypted version of data structure 202 includes (1) header 204 that is encrypted via a cryptographic scheme A or that is not encrypted and (2) body 206 that is encrypted via cryptographic scheme B. In another use case, as shown in FIG. 2B, header 204 may include a plurality of header portions (e.g., header portion 208a, header portion 208b, etc.), where each of the header portions may be encrypted with the same cryptographic scheme (e.g., cryptographic scheme A). However, as shown in FIG. 2C, each of the header portions may be encrypted with a different cryptographic scheme (e.g., cryptographic scheme A1 for header portion 208a, cryptographic scheme A2 for header portion 208b, etc.). In another use case, as shown in FIG. 2D, body 206 may include a plurality of body portions (e.g., body portion 208a, body portion 208b, etc.). In some embodiments, each of the body portions may be encrypted with the same cryptographic scheme (e.g., cryptographic scheme B). However, in another use case, as shown in FIG. 2E, each of the body portions may be encrypted with a different cryptographic scheme (e.g., cryptographic scheme B1 for body portion 208a, cryptographic scheme B2 for body portion 208b, etc.).

Returning to FIG. 1, in some embodiments, permissions subsystem 114 is configured to determine one or more permissions associated with information (that is to be represented in a data structure), and cryptographic subsystem 116 is configured to determine one or more cryptographic schemes for the information based on the determined permissions to generate one or more data structure portions for the data structure. As an example, where first and second information (e.g., first and second portions of content) are to be cryptographically represented in the form of first and second data structure portions of the data structure, permissions subsystem 114 may determine a first set of permissions associated with the first information and a second set of permissions associated with the second information. Cryptographic subsystem 116 may determine a first cryptographic scheme for the first information (e.g., based on the first set of permissions being associated with the first information) and a second cryptographic scheme for the second information (e.g., based on the second set of permission being associated with the second information). Cryptographic subsystem 116 may generate the data structure by generating the first data structure portion based on the first cryptographic scheme and generating the second data structure portion based on the second cryptographic scheme. As an example, the first and second cryptographic schemes (on which generation of the first and second data structure portions are respectively based) may be different from one another. In one use case, the first cryptographic scheme may include use of a first cryptographic key associated with a first entity, and the second cryptographic scheme may include use of a second cryptographic key associated with a second entity (e.g., different from the first cryptographic key). In another use case, the first cryptographic scheme may include use of a symmetric key associated with the first entity, and the second cryptographic scheme may include use of an asymmetric key associated with the second entity.

In some embodiments, permission subsystem 114 may obtain the first set and the second set of permissions from permissions database 134 (or other database). As an example, the first set of permissions may grant write access, read access, execute access, delete access, or other type of access for one or more first entities (or one or more first groups of entities). The second set of permissions may grant write access, read access, execute access, delete access, or other type of access for one or more second entities (or one or more second groups of entities). In one use case, with respect to FIG. 2G, content portion 220a may be associated with the first set of permissions (such as user role A, access level A, etc.), and content portions 220b and 220c may be associated with the second set of permissions (such as user role B, access level B, etc.). Based on the first set of permissions being associated with content portion 220a, cryptographic subsystem 116 may determine the first cryptographic key (e.g., a shared secret or other cryptographic key) as a key to be used to encrypt content portion 220a to produce data structure portion A (or an encrypted version of content portion 220a). Based on the second set of permissions being associated with content portions 220b and 220c, cryptographic subsystem 116 may determine the second cryptographic key (e.g., a public key of a public/private key pair or other cryptographic key) as a key to be used to encrypt content portions 220b and 220cto produce data structure portions B and C (or encrypted versions of content portions 220b and 220c).

In some embodiments, cryptographic subsystem 116 may generate the data structure to indicate in a header or other portion of the data structure (e.g., a file or other data structure) what portions of the data structure to show depending on what user application opened the data structure (e.g., a browser type or application ID), what user device opened the file (e.g., a device type or device ID), what user opened the data structure (e.g., user type or user ID), or other criteria. In some embodiments, cryptographic subsystem 116 may generate the data structure to indicate (in a header or other portion of the data structure) one or more cryptographic keys (e.g., symmetric key, asymmetric key, etc.) that are to be used to decrypt one or more portions of the data structure. As an example, for the first data structure portion of the data structure, such indication may be provided by specifying one or more identifiers of the first entities/groups of entities (with which the first set of permissions is associated) to indicate that the first information (corresponding to the first data structure portion) is intended to be accessed the first entities/groups of entities. For the second data structure portion of the data structure, such indication may be provided by specifying one or more identifiers of the second entities/groups of entities (with which the second set of permissions is associated) to indicate that the second information (corresponding to the second data structure portion) is intended to be accessed the second entities/groups of entities. In one use case, for instance, upon obtaining the data structure, an application (e.g., a mobile application or other application) may process the header (or other such portion) of the data structure to determine whether the current user of the application corresponds to any of the specified identifiers. If so, the application (e.g., the mobile application) may obtain one or more of the user's cryptographic keys to be used to extract information (intended for the user's access) from the respective data structure portions.

Figure 2F:
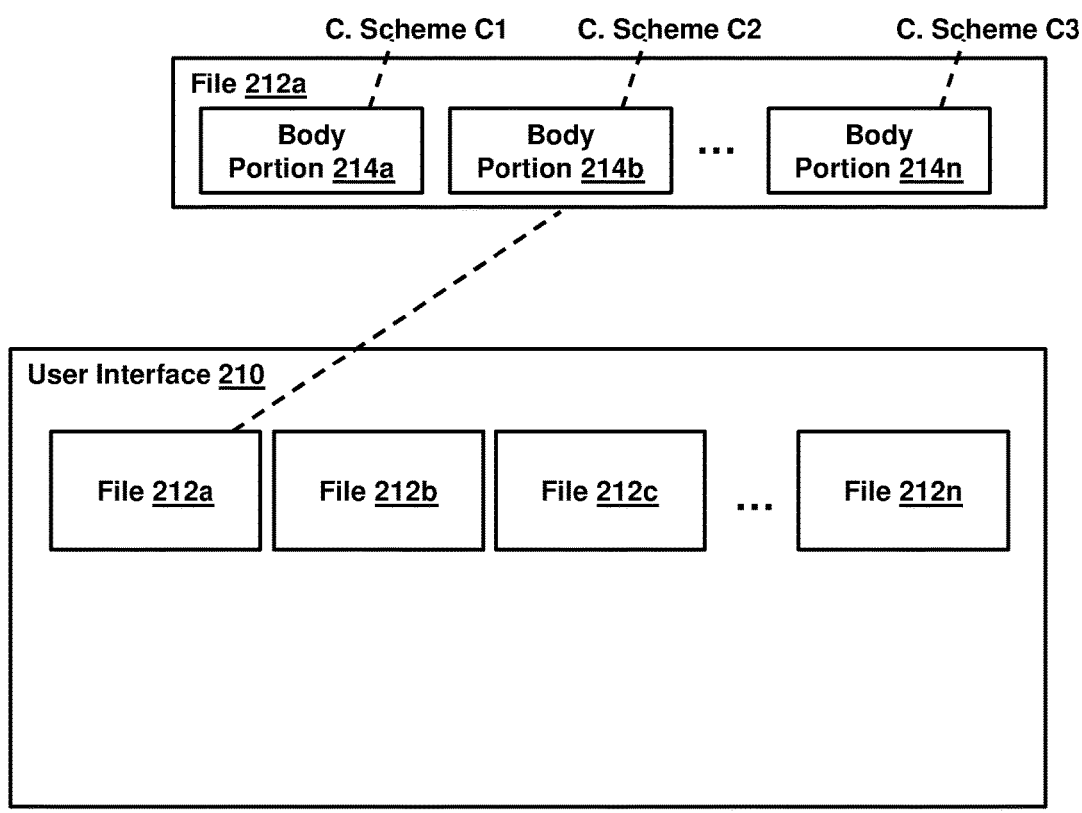
FIG. 2F shows a user interface used to access one or more files and representations of a file and a body of the file, in accordance with one or more embodiments.
Figure 2G:
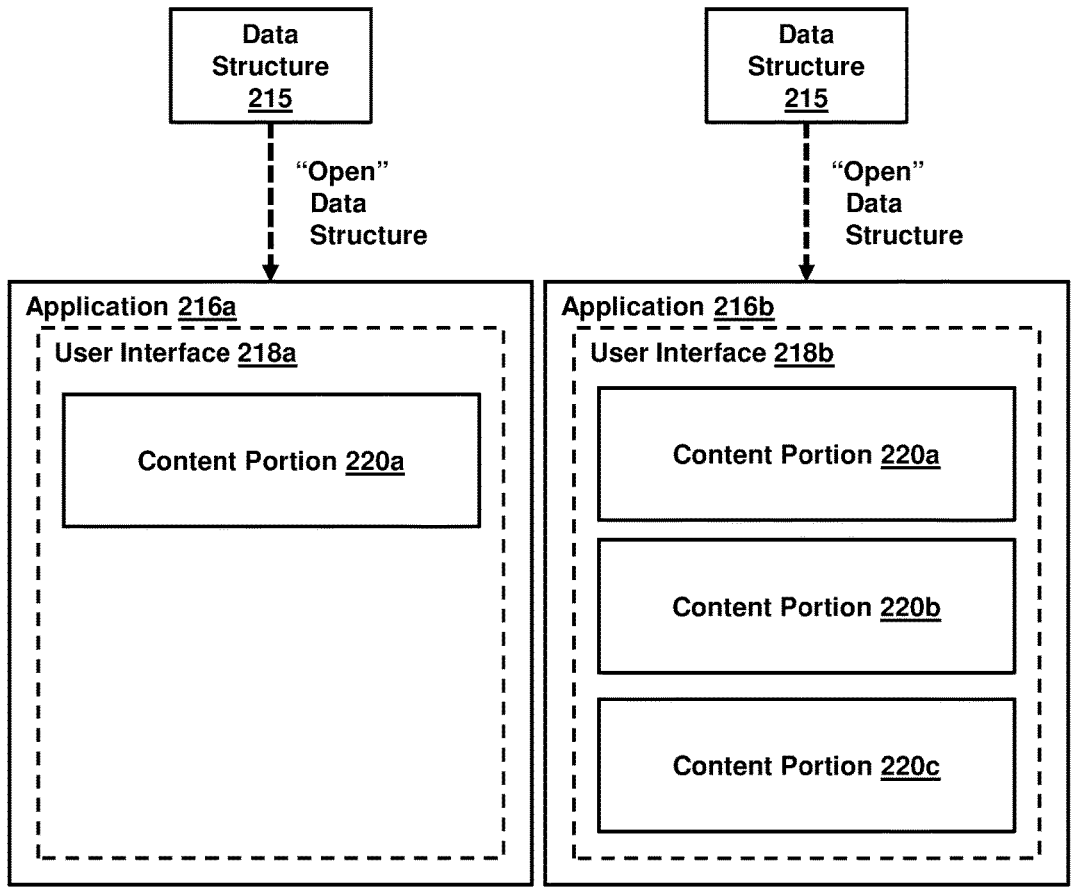
FIG. 2G shows the opening of a data structure by two users and the respective content portions represented by the data structure being presented to the two users, in accordance with one or more embodiments.

In some use cases, with respect to FIG. 2G, content portion 220a may include a list of allegories and corresponding desired meals without the names of the individuals, and content portions 220b or 220c may include the names or other personal information of the individuals who have such allergies and desire such meals. In its header or other part of data structure 215, data structure 215 may specify a user role A or an access level A for data structure portion A, where a chef, other meal preparers, and certain event managers are assigned to the user role A or satisfy access level A (e.g., they have access level A or an access level exceeding access level A). In its header or other part of data structure 215, data structure 215 may further specify a user role B or an access level B for data structure portions B and C, where the certain event managers are assigned to the user role B or satisfy access level B (where the chef or other meal preparers are not assigned to user role B or fail to satisfy access level B). Based on a processing of data structure 215, each application 216 may determine what user roles or access levels are specified for each of the data structure portions A, B, and C. If the application 216 determines that its user has a user role or access level satisfying a user role or access level specified for a data structure portion, the application 216 may attempt to retrieve the cryptographic key necessary to decrypt that data structure portion to extract the corresponding content from the data structure portion.

Figure 3A:
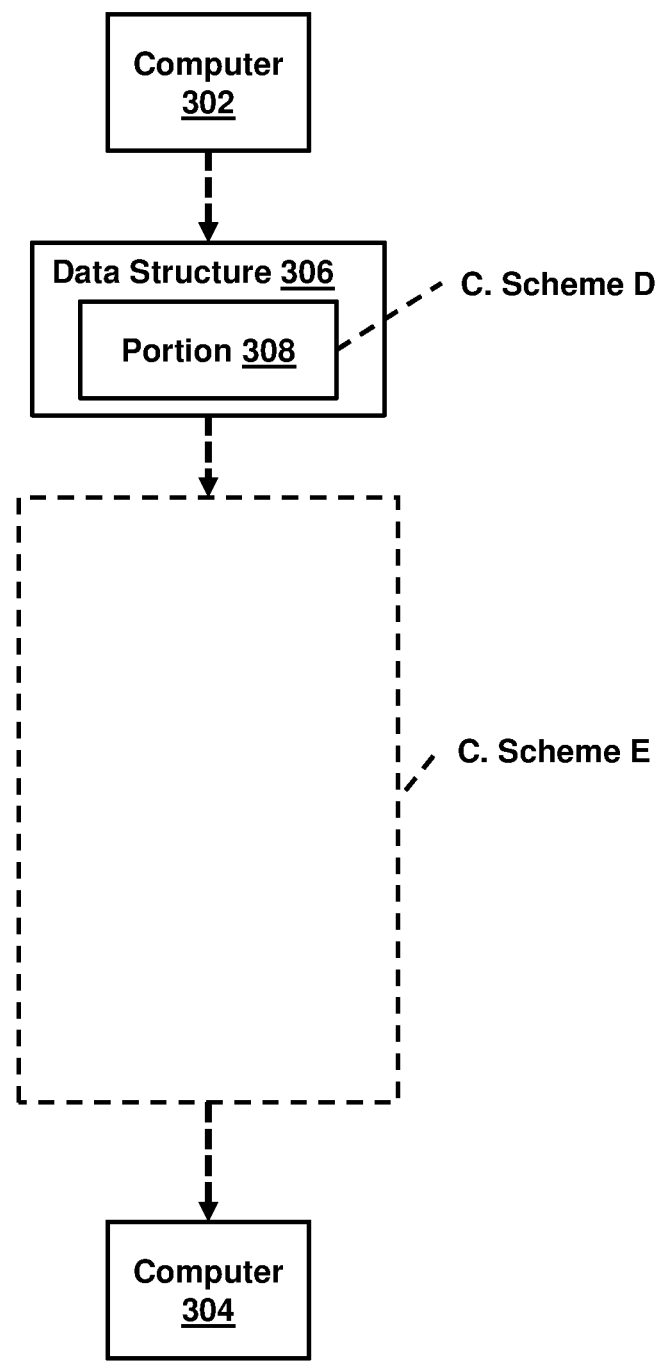
FIGS. 3A and 3B show use cases related to transmission of a data structure from one computer to another computer, in accordance with one or more embodiments.

In some embodiments, with respect to FIG. 3A, computer 302 may generate data structure 306 (e.g., medical list of allergies) for transmission to computer 304. In this example, data structure 306 may include a portion 308 generated based on a cryptographic scheme D (e.g., by encrypting the corresponding information with a first encryption key to produce portion 308). Additionally, data structure 306 may be encrypted via an overall cryptographic scheme E (e.g., encrypted with another encryption key to secure the transmission pipeline). With respect to FIG. 3A, a general user attempting to access data structure 306 would not be able to view any part of data structure 306 (and would only have access to the encrypted version of data structure 306). However, a user who has access to the corresponding keys (e.g., corresponding to the keys used for encryption) would have access to the contents of portion 308 (and/or the contents of other portions of data structure 306).

Returning to FIG. 1, in some embodiments, cryptographic subsystem 116 is configured to generate a first data structure portion of a data structure based on a first cryptographic scheme, a second data structure portion of the data structure based on a second cryptographic scheme, or one or more other data structure portion of the data structure based on one or more other cryptographic schemes. As generated, the first data structure portion may represent first information (e.g., a first portion of content), and the second data structure portion may represent second information (e.g., a second portion of content). In some embodiments, cryptographic subsystem 116 may use (i) the first cryptographic key (e.g., a symmetric key or other type of cryptographic key) to encrypt the first information to produce the first data structure portion and (ii) the second cryptographic key (e.g., an asymmetric key or other type of cryptographic key) to encrypt the second information to produce the second data structure portion. In some embodiments, the first data structure is generated without use of the second cryptographic key. In some embodiments, the second data structure portion is generated without use of the first cryptographic key. In one use case, for example, the data structure may be a file that includes contact information. In this example, a first portion (e.g., the business information) of the contact information may be encrypted with a symmetric key. Users that have been provided with the asymmetric key (e.g., employee of the same company) may decrypt the business contact information. Furthermore, personal information (which may not be desired to be viewed by everyone) may be encrypted using a personal key tied to an asymmetric encryption scheme.

In some embodiments, where first and second information (e.g., first and second portions of content) are to be cryptographically represented in the form of first and second data structure portions of the data structure, cryptographic subsystem 116 is configured to generate the first data structure portion and the second data structure portion by (i) using a symmetric cryptographic scheme (e.g., a symmetric cryptographic algorithm, a symmetric key compatible with such algorithm, etc.) to encrypt the first information to produce the first data structure portion and (ii) using an asymmetric cryptographic scheme (e.g., an asymmetric cryptographic algorithm, an asymmetric key compatible with such algorithm, etc.) to encrypt the second information to produce the second data structure portion. In some embodiments, the first data structure portion is generated without use of the asymmetric cryptographic scheme (e.g., without use of the asymmetric key). In some embodiments, the second data structure portion is generated without use of the symmetric cryptographic scheme (e.g., without use of the symmetric key).

Figure 3B:
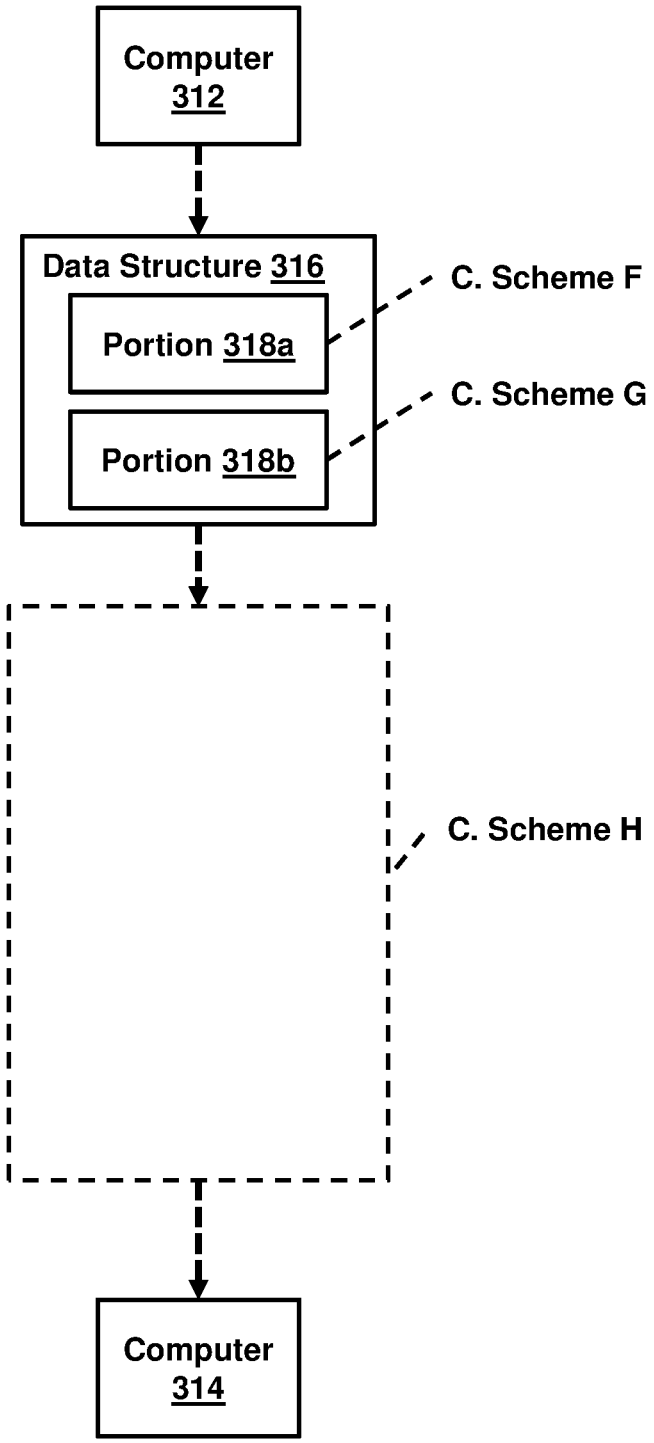

As an example, with respect to FIG. 3B, data structure 316 may include portion 318a generated based on a cryptographic scheme F (e.g., a symmetric encryption key or other encryption key) and portion 318b generated based on a cryptographic scheme G (e.g., an asymmetric encryption key or other encryption key different from the key via which portion 318a is generated). Additionally, data structure 316 may be encrypted via an overall cryptographic scheme H (e.g., encrypted with another encryption key to secure the transmission pipeline). In one use case, where data structure 316 represents a list of allergies of individuals for an event, portion 318a may include an encrypted version of the allergies and corresponding desired meals without the names of the individuals who have such allergies and desire such meals, and portion 318b may include an encrypted version of the names of the individuals who have such allergies and desire such meals. As such, in another use case, data structure 316 may indicate (e.g., in its header or other part thereof) that the contents of portion 318a is intended for a chef or others preparing the meals for the event and certain event managers for the event and that the contents of portion 318b is intended for the certain event managers. As an example, in its header or other part of data structure 316, data structure 316 may specify a user role A or an access level A for portion 318a, where the chef/other meal preparers and the certain event managers are assigned to the user role A or satisfy access level A (e.g., they have access level A or an access level exceeding access level A). In its header or other part of data structure 316, data structure 316 may further specify a user role B or an access level B for portion 318b, where the certain event managers are assigned to the user role B or satisfy access level B (and where the chef or other meal preparers are not assigned to user role B or fail to satisfy access level B). This would allow the chef/other meal preparers to access the list of allergies and desired meals but not to the specific list of individuals to which the allergies and desired meals apply.

Returning to FIG. 1, prediction subsystem 118 is configured to facilitate prediction-model-based (i) creation of secure data structures, (ii) distribution and security of information, and/or (iii) generation and updating of action items, events (e.g., electronic appointment, meeting invitation, etc., with times, locations, attachments, attendees, etc.), conversations, documents, or other items. Presentation subsystem 120 is configured to present, via one or more user interfaces, the action items, the events, the conversations, the documents, predictions of the foregoing items, or other information. In some embodiments, prediction subsystem 118 may enable one or more prediction models (e.g., described above) to be trained. Training data used to train the prediction models may include (i) a set of content items or information, (ii) reference outputs that are to be derived from a prediction model's processing of such content items or information (e.g., user-confirmed or user-provided outputs, outputs confirmed through one or more prediction models' processing of such content items, outputs confirmed multiple times by processing of such content items or information by respective sets of prediction models, or other reference outputs), (iii) reference indications of outputs that are not to be derived from a machine learning model's processing of such content items or information (e.g., user indications that such outputs are inaccurate or other reference indications), or (iv) other training data.

In some embodiments, upon obtaining a set of content items, model subsystem 114 may cause a prediction model to generate predictions related to action items, events, conversations, documents, permissions associated with the foregoing items, or other information. Model subsystem 114 may analyze those predictions against a set of reference feedback, such as reference predictions of information to be included in a content item or reference permissions associated therewith. In one use case, the reference outputs may be provided as input to the prediction model (e.g., prior to, simultaneously with, or subsequent to providing the content items to the prediction model), which the prediction model may utilize to determine whether its predictions are accurate, determine the level of accuracy or completeness with respect to each prediction, or other make other determinations (e.g., via deep learning through its multiple layers of abstraction or other techniques). Such determinations may be utilized by the prediction model to improve the accuracy or completeness of its predictions. In another use case, accuracy or completeness indications with respect to the prediction model's predictions (e.g., whether a given prediction is accurate, how accurate or complete a given prediction is, etc.) may be provided to the prediction model, which, in turn, may utilize the accuracy or completeness indications to improve the accuracy or completeness of its mapping predictions.

In some embodiments, prediction subsystem 118 may cause, via a prediction model (e.g., trained as described herein), an addition, modification, or removal of action items, events, conversations, documents, or other items based on one or more context sources. These operations may, for example, be automatically initiated based on the context sources. The context sources may comprise one or more other actions items, events, conversations, documents, or other context sources. As an example, one or more action items may be generated and added (e.g., to a project, action item set, etc.) based on one or more events, conversations, documents, other action items, or other items (e.g., associated with the project or those associated with other projects). Additionally, or alternatively, the action items may be modified or removed (e.g., from the project, the action item set, etc.) based on one or more events, conversations, documents, other action items, or other items (e.g., associated with the project or those associated with other projects). In one use case, a user interface may show an action item (e.g., action item no. 00008688) that may have been generated based on a conversation and a meeting (e.g., conversation no. 00001776 and meeting no. 00001984). For example, one or more fields of the meeting (e.g., a calendar invite for the meeting) may list one or more agenda items for discussion, such as which refrigerator is to be added to a kitchen of a remodeled home. During the conversation, an indication that a particular brand and color is to be purchased for the kitchen of the remodeled home may occur. The conversation (e.g., a text chat, a video chat, a teleconference call, etc.) may be recorded, and the conversation recording may be stored. If the conversation is already associated in a database with the meeting, a prediction model that processes the conversation (and previously processed the meeting) may detect that the conversation and the meeting are related based on the stored record of the association, the relatedness between the agenda items of the meeting and the discussion during the conversation (e.g., both specify refrigerators), or other criteria (e.g., time of the meeting and time of the conversation). If, for instance, the conversation and the meeting are not already associated with one another, the prediction model may detect that they are related to one another based on a predefined time of the meeting and a time that the conversation occurred, and/or based on one or more other criteria, such as the relatedness between the agenda items and the discussion during the conversation or other criteria.

Upon detecting that the meeting and the conversation are related (and/or determining that their relatedness satisfies a predefined relatedness threshold), the prediction model may utilize the contents of the meeting and the conversation to generate the action item and associate the action item with the project/action item set. In one scenario, the prediction model may perform natural language processing on the contents of the meeting and the conversation to generate the action item. For instance, if a manager approves the purchasing of a refrigerator of a particular brand and color during the conversation (e.g., "Manager A" listed on the user interface 302), this approval may be detected during processing of the contents of the conversation, and cause the action item to "Buy Brand X Refrigerator in Color Y" to be generated and added to the project/action item set.

As another example, one or more events may be initiated and added (e.g., to a project, action item set, etc.) based on one or more action items, conversations, documents, other events, or other items (e.g., associated with the project or those associated with other projects). Additionally, or alternatively, the events may be modified or removed from the project based on one or more action items, conversations, documents, other events, or other items (e.g., associated with the project or those associated with other projects). In one use case, a user interface may show a meeting (e.g., meeting no. 00001984) that may have been generated based on a conversation (e.g., conversation no. 00001774) and an action item (e.g., action item no. 00008684). For example, the action item may be created by a user to specify that a meeting to discuss kitchen appliances for a kitchen of a remodeled home should take place. If the conversation subsequently takes place and includes discussions regarding the required or optional attendees for such a meeting, the prediction model (which is provided the conversation as input) may generate a calendar invite for the meeting and add the meeting (e.g., to the project, action item set, etc.) based on the conversation. The generated calendar invite may, for instance, include the required or optional attendees based on the context subsystem 118 detecting such discussion during the conversation, as well as the title field or other fields based on the prediction model processing the fields of the action item previously created by the user.

In some embodiments, upon obtaining a list of individuals (e.g., event invitees), prediction subsystem 118 may cause a prediction model to generate predictions based on one or more attributes corresponding to each of the individuals. In one use case, prediction subsystem 118 may be trained on individuals' contact information (e.g., person's name, phone number, etc.) or other information (personal like/dislikes, allergies, etc.). In some embodiments, prediction subsystem 118 may obtain a list of individuals attending an event from an entity (e.g., a calendar application). In some embodiments, prediction subsystem 118 may automatically generate a food order which does not contain any food item that would cause an individual to have an allergic reaction. In some embodiments, prediction subsystem 118 may automatically generate one or more purchase orders for the consumables to ensure that all the food arrives for the event.

Subsystems 122-124

In some embodiments, cryptographic subsystem 122 is configured to obtain a data structure and extract information from the data structure based on one or more cryptographic schemes. In some embodiments, where first and second information (e.g., first and second portions of content) are cryptographically represented in the form of first and second data structure portions of the data structure, cryptographic subsystem 122 may process the data structure to (i) determine a first cryptographic scheme for extracting data from the first data structure portion and (ii) determine a second cryptographic scheme for extracting data from the second data structure portion. Based on such determination, cryptographic subsystem 122 may obtain the first information from the first data structure portion based on the first cryptographic scheme and obtain second information from the second data structure portion based on the second cryptographic scheme.

In some embodiments, based on its processing of the data structure, cryptographic subsystem 122 may determine a first cryptographic key for extracting data from the first data structure portion and a second cryptographic key (e.g., different from the first cryptographic key) for extracting data from the second data structure portion. In some embodiments, based on its processing of the data structure, cryptographic subsystem 122 may determine a symmetric cryptographic scheme (e.g., a symmetric cryptographic algorithm, a symmetric key compatible with such algorithm, etc.) for extracting data from the first data structure portion and an asymmetric cryptographic scheme (e.g., an asymmetric cryptographic algorithm, an asymmetric key compatible with such algorithm, etc.) for extracting data from the second data structure portion. By way of example, with respect to FIG. 2F, an application's user interface 210 may present files 212a-212n to the application's user. As shown in FIG. 2F, each of body portions 214a, 214b, and 214n were generated based on a different cryptographic scheme (e.g., a different encryption key and/or a different cryptographic algorithm). Thus, in some use cases, a different decryption key (and/or a different cryptographic algorithm) must be used to decrypt each of body portions 214a, 214b, and 214n to obtain the corresponding content from the body portions 214. As an example, body portion 214a may be decrypted using a cryptographic key C1 (corresponding to cryptographic scheme C1), and body portion 214b may be decrypted using a cryptographic key C2 (corresponding to cryptographic scheme C2). Use of cryptographic key C2 is not needed to decrypt (and cannot be used to decrypt) body portion 214a. Use of cryptographic key C1 is not needed to decrypt (and cannot be used to decrypt) body portion 214b.

In one use case, with respect to the foregoing scenario related to FIG. 2F, the user has access to all files 212a-212n, but only has access (e.g., read access) to content corresponding to certain portions of each of those files 212a-212n. As such, the user may select to open each file via the application, but, when the user selects to open a particular file, the application may only present the corresponding content (of the particular file) to which the user has access. When the user selects to open file 212a, the application may process file 212a to determine which of body portions 214a-214n corresponds to content that the user has permission to access. The application may, for instance, determine from the header (or other part) of file 212a which body portions 214a-214n can be decrypted by the application to produce the corresponding content by checking whether the user is associated with any identifier that is attributed to a body portion 214 and specified in the header (or other part) of file 212a. If the user is associated with such an identifier (e.g., because the identifier identifies the user, a role to which the user belongs, an access level that the user satisfies, etc.), the application may determine that the user has access to a cryptographic key that can be used to decrypt the body portion 214 (to which the identifier is attributed).

In some use cases, with respect to the foregoing scenario related to FIG. 2F, the cryptographic key (for decrypting a given body portion 214) may be stored on the user's client device (e.g., on which the application is also hosted), and the application may obtain the cryptographic key from a secure memory of the client device (e.g., by querying the secure memory with the identifier attributed to the respective body portion 214 to obtain the cryptographic key from the secure memory). In some use cases, the cryptographic key may be stored on a server-side computer system (e.g., on behalf of the user), and the application may obtain the cryptographic key from the server-side computer system (or a database associated therewith, e.g., cryptographic database 136 or other database). As an example, the application may query the server-side computer system using the user's credentials (e.g., username, password, etc.) along with the identifier attributed to the respective body portion 214 (or other parameters). If server-side computer system determines (based on the user's credentials) that the user has the requisite access rights to the cryptographic key (which may be stored in association with the identifier), the server-side computer system may return the cryptographic key to the application.

In some embodiments, presentation subsystem 122 is configured to effectuate presentation of first information, second information, or other information that was successfully decrypted via cryptographic subsystem 122. In some embodiments, presentation subsystem 122 is configured determine one or more data structure portions that may not be properly decrypted for a given user. In some embodiments, presentation subsystem 122 is configured to indicate one or more portions of the data structure that could not be presented based on the determination that the respective data structure portions could not properly be decrypted. Such indications may be presented with the information extracted by decrypting one or more other portions of the data structure. Additionally, or alternatively, in some embodiments, presentation subsystem 122 is configured to hide one or more portions of the data structure based on the determination that the respective data structure portions could not properly be decrypted. In this way, for example, where all portions that could not be decrypted are hidden from the user, the user is given no indication that certain portions are not available to the user, thereby reducing any negative user experience related to situations in which the user realizes that he/she is restricted from certain content of a file or other data structure.

By way of example, with respect to FIG. 2G, a first user may access data structure 215 via application 216a (e.g., by specifying the "Open" command), but application 216a only presents content portion 220a on its user interface 218a (e.g., without being able to present content portions 220b and 220c to the user). On the other hand, a second user may access the same data structure 215 via application 216b (e.g., where applications 216a and 216b may be two instances of the same application) and is presented with content portions 220a, 220b, and 220c on user interface 218b. In one use case, for example, data structure 216 may include data structure portions A, B, and C that are encrypted versions of content portions 220a, 220b, and 220c, respectively, where (i) a shared secret (e.g., a private key used in conjunction with a symmetric cryptographic algorithm) is used to encrypt content portion 220a to produce data structure portion A, and (ii) a public key of a public/private key pair (e.g., used in conjunction with an asymmetric cryptographic algorithm) is used to encrypt content portions 220b and 220c. Each application 216 may process data structure 215 (e.g., its header or other part thereof) to determine the data structure portions (of data structure 215) for which the user has one or more corresponding cryptographic keys that can be used to respectively decrypt the data structure portions.

In another use case, with respect to FIG. 2G and the allergies/meals examples described herein, content portion 220a may include the list of allegories and corresponding desired meals without the names of the individuals, and content portions 220b or 220c may include the names or other personal information of the individuals who have such allergies and desire such meals. In its header or other part of data structure 215, data structure 215 may specify a user role A or an access level A for data structure portion A, where a chef, other meal preparers, and certain event managers are assigned to the user role A or satisfy access level A (e.g., they have access level A or an access level exceeding access level A). In its header or other part of data structure 215, data structure 215 may further specify a user role B or an access level B for data structure portions B and C, where the certain event managers are assigned to the user role B or satisfy access level B (where the chef or other meal preparers are not assigned to user role B or fail to satisfy access level B).

Based on a processing of data structure 215, each application 216 may determine what user roles or access levels are specified for each of the data structure portions A, B, and C. If the application 216 determines that its user has a user role or access level satisfying a user role or access level specified for a data structure portion, the application 216 may attempt to retrieve the cryptographic key necessary to decrypt that data structure portion to extract the corresponding content from the data structure portion. For data structure portion A, the application 216 may perform a query based on an identifier or other attribute of user role A or access level A (e.g., "UserRoleA," "AccessLevelA," a set of permissions associated with user role A or access level A, etc.) to retrieve the shared secret (used to encrypt content portion 220a). For data structure portions B and C, the application 216 may perform a query based on an identifier or other attribute of user role B or access level B (e.g., "UserRoleB," "AccessLevelB," a set of permissions associated with user role B or access level B, etc.) to retrieve the private key (corresponding to the public key used to encrypt content portions 220b and 220c). However, because the user of application 216a did not have a user role or access level that satisfied the specified user role or access level for data structure portions B and C, application 216a may not have attempted to retrieve (or could not retrieve) the corresponding private key needed to decrypt data structure portions B and C, and, thus, could not present content portions 220b and 220c to its user. On the other hand, application 216b is able to retrieve the corresponding private key needed to decrypt data structure portions B and C, and, as such, does present content portions 220b and 220c to its user.

Examples Flowcharts

Figure 4:
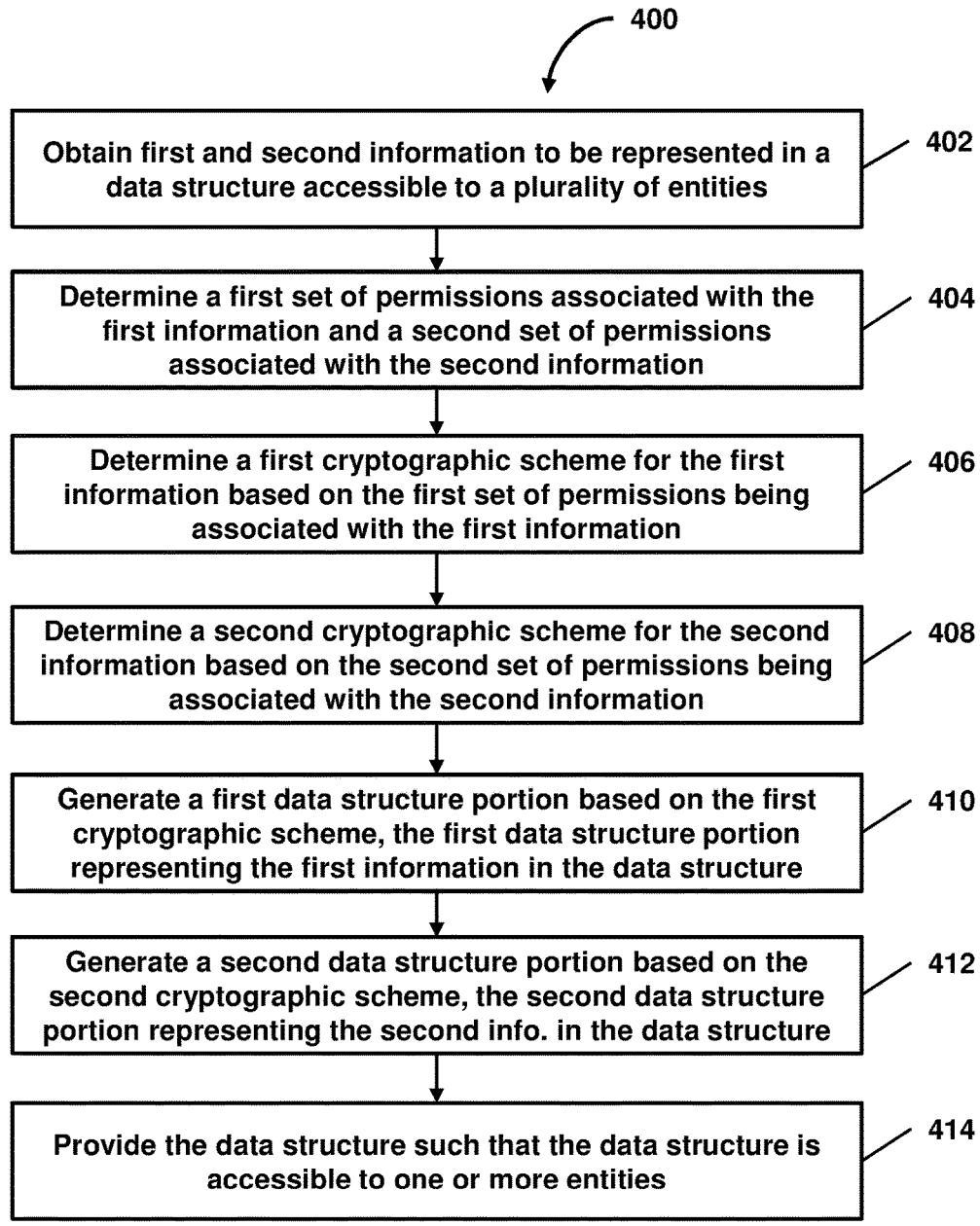
FIG. 4 shows a flowchart of a method of providing a data structure with different cryptographic schemes for different portions of the data structure, in accordance with one or more embodiments.
Figure 5:
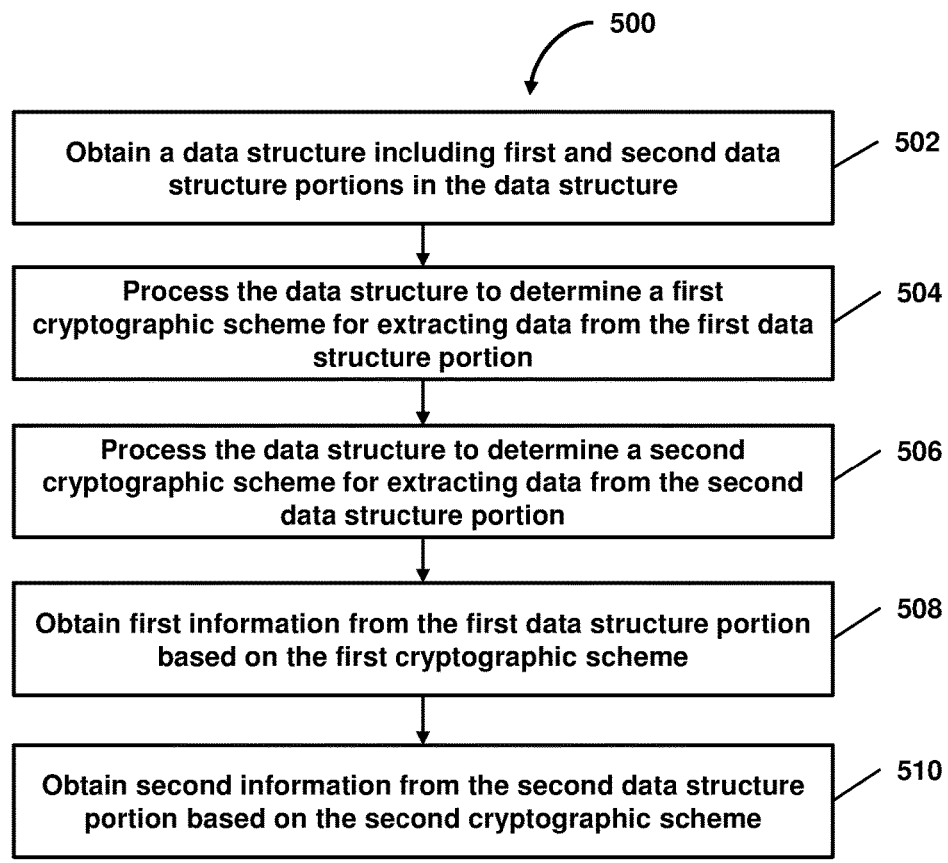
FIG. 5 shows a flowchart of a method of processing a data structure with different cryptographic schemes for different portions of the data structure, in accordance with one or more embodiments.

FIGS. 4 and 5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 of providing a data structure with different cryptographic schemes for different portions of the data structure, in accordance with one or more embodiments.

In an operation 402, first and second information to be represented in a data structure (accessible to a plurality of entities) may be obtained. The data structure may include a file, a linked list, an array, a record, or other data structure. As an example, the first information may be intended for one or more first entities, and the second information may be intended for one or more second entities. In some use cases, the first and second information may be represented in a body of the data structure (e.g., a body of the file, the linked list, the array, the record, etc.). Operation 402 may be performed by a subsystem that is the same as or similar to data manager subsystem 112, in accordance with one or more embodiments.

In an operation 404, a first set of permissions associated with the first information and a second set of permissions associated with the second information may be determined. As an example, the first set of permissions may grant write access, read access, execute access, delete access, or other type of access for one or more first entities (or one or more first groups of entities). The second set of permissions may grant write access, read access, execute access, delete access, or other type of access for one or more second entities (or one or more second groups of entities). Operation 404 may be performed by a subsystem that is the same as or similar to permissions subsystem 114, in accordance with one or more embodiments.

In an operation 406, a first cryptographic scheme may be determined for the first information based on the first set of permissions being associated with the first information. Operation 406 may be performed by a subsystem that is the same as or similar to cryptographic subsystem 116, in accordance with one or more embodiments.

In an operation 408, a second cryptographic scheme may be determined for the second information based on the second set of permission being associated with the second information. As an example, the second cryptographic scheme may be different from the first cryptographic scheme. In one use case, the first cryptographic scheme may include use of a first cryptographic key (e.g., associated with a first entity), and the second cryptographic scheme may include use of a second cryptographic key (e.g., associated with a second entity different from the first entity) different from the first cryptographic key. In another use case, the first cryptographic scheme may include a symmetric cryptographic scheme, and the second cryptographic scheme may include an asymmetric cryptographic scheme. In another use case, the first cryptographic scheme may include use of a symmetric key, and the second cryptographic scheme may include use of an asymmetric key. Operation 408 may be performed by a subsystem that is the same as or similar to cryptographic subsystem 116, in accordance with one or more embodiments.

In an operation 410, a first data structure portion may be generated based on the first cryptographic scheme. As an example, the first data structure portion may represent the first information in the data structure (e.g., in a body of the data structure, in a header of the data structure, or other portion of the data structure). As another example, the first data structure may be generated without use of the second cryptographic scheme. Operation 410 may be performed by a subsystem that is the same as or similar to cryptographic subsystem 116, in accordance with one or more embodiments.

In an operation 412, a second data structure portion may be generated based on the second cryptographic scheme. As an example, the second data structure portion may represent the second information in the data structure (e.g., in a body of the data structure, in a header of the data structure, or other portion of the data structure). As another example, the second data structure may be generated without use of the first cryptographic scheme. Operation 412 may be performed by a subsystem that is the same as or similar to cryptographic subsystem 116, in accordance with one or more embodiments.

In an operation 414, the data structure may be provided such that the data structure is accessible to one or more entities. Operation 414 may be performed by a subsystem that is the same as or similar to data manager subsystem 112, in accordance with one or more embodiments.

In some embodiments, one or more of the obtainment of the permissions, the determination of the cryptographic schemes, the generation of the data structure portions for the data structure, or other operations described herein may be automatically performed by one or more of the foregoing subsystems performing operations 402-414. As an example, the obtainment of the permissions may be performed without any further user input (i) provided subsequent to one or more of the foregoing subsystems obtaining a request to create the data structure and (ii) specifying the permissions (e.g., any of the permissions, all of the permissions, etc.). As another example, the determination of the cryptographic schemes and the generation of the data structure portions may be performed without any further user input (i) provided subsequent to one or more of the foregoing subsystems obtaining the request to create the data structure and (ii) specifying the cryptographic schemes (e.g., any of the cryptographic schemes, all of the cryptographic schemes, etc.). In some embodiments, one or more of the obtainment of the permissions, the determination of the cryptographic schemes, the generation of the data structure portions for the data structure, or other operations described herein may be automatically performed by a single application (e.g., a computer program, a mobile application, or other application) comprising or in communication with one or more of the foregoing subsystems performing operations 402-414.

FIG. 5 shows a flowchart of a method 500 of processing a data structure with different cryptographic schemes for different portions of the data structure, in accordance with one or more embodiments.

In an operation 502, a data structure (including first and second data structure portions) may be obtained. As an example, the first data structure portion may be generated based on a first cryptographic scheme, and the second data structure portion may be generated based on a second cryptographic scheme different from the first cryptographic scheme. In one use case, the first cryptographic scheme may include use of a first cryptographic key (e.g., associated with a first entity), and the second cryptographic scheme may include use of a second cryptographic key (e.g., associated with a second entity different from the first entity) different from the first cryptographic key. In another use case, the first cryptographic scheme may include a symmetric cryptographic scheme, and the second cryptographic scheme may include an asymmetric cryptographic scheme. In another use case, the first cryptographic scheme may include use of a symmetric key, and the second cryptographic scheme may include use of an asymmetric key. The data structure may include a file, a linked list, an array, a record, or other data structure. As an example, the first information may be intended for one or more first entities, and the second information may be intended for one or more second entities. In some use cases, the first and second information may be represented in a body of the data structure (e.g., a body of the file, the linked list, the array, the record, etc.). Operation 502 may be performed by a subsystem that is the same as or similar to cryptographic subsystem 122, in accordance with one or more embodiments.

In operations 504 and 506, the data structure may be processed to determine the first cryptographic scheme for extracting data from the first data structure portion and the second cryptographic scheme for extracting data from the second data structure portion. As an example, the data structure may be processed to determine a first cryptographic key for extracting data from the first data structure portion and a second cryptographic key (different from the first cryptographic key) for extracting data from the second data structure portion. As another example, the data structure may be processed to determine a symmetric cryptographic scheme for extracting data from the first data structure portion and an asymmetric cryptographic scheme for extracting data from the second data structure portion. As another example, the data structure may be processed to determine a symmetric key for extracting data from the first data structure portion and an asymmetric key for extracting data from the second data structure portion. Operations 504 and 506 may be performed by a subsystem that is the same as or similar to cryptographic subsystem 122, in accordance with one or more embodiments.

In an operation 508, the first information may be obtained from the first data structure portion based on the first cryptographic scheme. As an example, the first information may be obtained from the first data structure portion without use of the second cryptographic scheme. Operation 508 may be performed by a subsystem that is the same as or similar to cryptographic subsystem 122, in accordance with one or more embodiments.

In an operation 510, second information may be obtained from the second data structure portion based on the second cryptographic scheme. As an example, the second information may be obtained from the second data structure portion without use of the first cryptographic scheme. Operation 510 may be performed by a subsystem that is the same as or similar to cryptographic subsystem 122, in accordance with one or more embodiments.

In some embodiments, with respect to operations 508 and 510, the first information may be obtained from the first data structure portion by using the first cryptographic key (of the first cryptographic scheme) to decrypt the first data structure portion to produce the first information (e.g., without use of the second cryptographic key, with use of the second cryptographic key, etc.). The second information may be obtained from the second data structure portion by using the second cryptographic key (of the second cryptographic scheme) to decrypt the second data structure portion to produce the second information (e.g., without use of the first cryptographic key, with use of the first cryptographic key, etc., etc.).

In some embodiments, with respect to operations 508 and 510, the first information may be obtained from the first data structure portion by using the symmetric cryptographic scheme (e.g., including use of the symmetric key) to decrypt the first data structure portion to produce the first information (e.g., without use of the asymmetric key, with use of the asymmetric key, etc.). The second information may be obtained from the second data structure portion by using the asymmetric cryptographic scheme (e.g., including use of the asymmetric key) to decrypt the second data structure portion to produce the second information (e.g., without use of the symmetric key, with use of the symmetric key, etc.).

In some embodiments, one or more of the determination of the cryptographic schemes (e.g., including which cryptographic schemes are associated with the user or other related determinations), the obtainment of the information from the data structure portions, or other operations described herein may be automatically performed by one or more of the foregoing subsystems performing operations 502-510. As an example, the determination of the cryptographic schemes and the obtainment of the information from the data structure portions may be performed without any further user input (i) provided subsequent to one or more of the foregoing subsystems obtaining a request to access at least one of the data structure portions (or the corresponding content portions) and (ii) specifying the cryptographic schemes (e.g., any of the cryptographic schemes, all of the cryptographic schemes, etc.). In some embodiments, one or more of the determination of the cryptographic schemes, the obtainment of the information from the data structure portions, or other operations described herein may be automatically performed by a single application (e.g., a computer program, a mobile application, or other application) comprising or in communication with one or more of the foregoing subsystems performing operations 502-510.

In some embodiments, the various computers and subsystems illustrated in FIG. 1 may include one or more computing devices that are programmed to perform the functions described herein. The computing devices may include one or more electronic storages (e.g., management database(s) 132, which may include permissions database(s) 134, cryptographic database(s) 136, context database(s) 138, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide data processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining first and second information to be represented in a body of a data structure accessible to a plurality of entities; determining a first set of permissions associated with the first information and a second set of permissions associated with the second information; determining a first cryptographic scheme for the first information based on the first set of permissions being associated with the first information and a second cryptographic scheme for the second information based on the second set of permission being associated with the second information; generating a first data structure portion based on the first cryptographic scheme, the first data structure portion representing the first information in the data structure; generating a second data structure portion based on the second cryptographic scheme, the second data structure portion representing the second information in the body of the data structure; and providing the data structure comprising the first and second data structure portions such that the data structure is accessible to one or more entities.

2. The method of embodiment 1, wherein the data structure comprises a file, and the file comprises the first and second data structure portions.

3. The method of any of embodiments 1-2, wherein the data structure comprises a linked list, and the linked list comprises the first and second data structure portions.

4. The method of any of embodiments 1-3, wherein the data structure comprises an array, and the array comprises the first and second data structure portions.

5. The method of any of embodiments 1-4, wherein the data structure comprises a record, and the record comprises the first and second data structure portions.

6. The method of any of embodiments 1-5, further comprising: determining the first cryptographic scheme for the first information by determining a first cryptographic key for the first information based on the first set of permissions being associated with the first information; determining the second cryptographic scheme for the second information by determining a second cryptographic key for the second information based on the second set of permission being associated with the second information; generating the first data structure portion by using the first cryptographic key to encrypt the first information to produce the first data structure portion; and generating the second data structure portion by using the second cryptographic key to encrypt the second information to produce the second data structure portion.

7. The method of embodiment 6, wherein the first data structure portion is generated without use of the second cryptographic key.

8. The method of any of embodiments 6-7, wherein the second data structure portion is generated without use of the first cryptographic key.

9. The method of any of embodiments 1-8, further comprising: determining the first cryptographic scheme for the first information by determining a symmetric key for the first information based on the first set of permissions being associated with the first information; determining the second cryptographic scheme for the second information by determining an asymmetric key for the second information based on the second set of permission being associated with the second information; generating the first data structure portion by using the symmetric key to encrypt the first information to produce the first data structure portion; and generating the second data structure portion by using the asymmetric key to encrypt the second information to produce the second data structure portion.

10. The method of embodiment 9, wherein the first data structure portion is generated without use of the asymmetric key.

11. The method of any of embodiments 9-10, wherein the second data structure portion is generated without use of the symmetric key.

12. The method of any of embodiments 1-11, further comprising: determining the first cryptographic scheme for the first information by determining a symmetric cryptographic scheme for the first information based on the first set of permissions being associated with the first information; determining the second cryptographic scheme for the second information by determining an asymmetric cryptographic scheme for the second information based on the second set of permission being associated with the second information; generating the first data structure portion by using the symmetric cryptographic scheme to encrypt the first information to produce the first data structure portion; and generating the second data structure portion by using the asymmetric cryptographic scheme to encrypt the second information to produce the second data structure portion.

13. The method of embodiment 12, wherein the first data structure portion is generated without use of the asymmetric cryptographic scheme.

14. The method of any of embodiments 12-13, wherein the second data structure portion is generated without use of the symmetric cryptographic scheme.

15. The method of any of embodiments 1-14, wherein the first cryptographic scheme comprises use of a first cryptographic key associated with a first entity, and wherein the second cryptographic scheme comprises use of a second cryptographic key associated with a second entity.

16. The method of any of embodiments 1-15, wherein the first data structure portion represents the first information in a body of the data structure, and wherein the second data structure portion represents the second information in the body of the data structure.

17. The method of any of embodiments 1-16, wherein the first data structure portion is generated without use of the second cryptographic scheme.

18. The method of any of embodiments 1-17, wherein the second data structure portion is generated without use of the first cryptographic scheme.

19. A method comprising: obtaining a data structure comprising first and second data structure portions in the data structure, the first data structure portion being generated based on a first cryptographic scheme, and the second data structure portion being generated based on a second cryptographic scheme; processing the data structure to determine the first cryptographic scheme for extracting data from the first data structure portion and the second cryptographic scheme for extracting data from the second data structure portion; obtaining first information from the first data structure portion based on the first cryptographic scheme; and obtaining second information from the second data structure portion based on the second cryptographic scheme.

20. The method of embodiment 19, wherein the data structure comprises a file, and the file comprises the first and second data structure portions.

21. The method of any of embodiments 19-20, wherein the data structure comprises a linked list, and the linked list comprises the first and second data structure portions.

22. The method of any of embodiments 19-21, wherein the data structure comprises an array, and the array comprises the first and second data structure portions.

23. The method of any of embodiments 19-22, wherein the data structure comprises a record, and the record comprises the first and second data structure portions.

24. The method of claim 19, further comprising: determining the first cryptographic scheme by determining a first cryptographic key for extracting data from the first data structure portion; determining the second cryptographic scheme by determining a second cryptographic key for extracting data from the second data structure portion; obtaining the first information from the first data structure portion by using the first cryptographic key to decrypt the first data structure portion to produce the first information; and obtaining second information from the second data structure portion by using the second cryptographic key to decrypt the second data structure portion to produce the second information.

25. The method of embodiment 24, wherein the first information is obtained from the first data structure portion without use of the second cryptographic key.

26. The method of any of embodiments 24-25, wherein the second information is obtained from the second data structure portion without use of the first cryptographic key.

27. The method of claim 19, further comprising: determining the first cryptographic scheme by determining a symmetric key for extracting data from the first data structure portion; determining the second cryptographic scheme by determining an asymmetric key for extracting data from the second data structure portion; obtaining the first information from the first data structure portion by using the symmetric key to decrypt the first data structure portion to produce the first information, the first information being obtained from the first data structure portion without use of the asymmetric key; and obtaining second information from the second data structure portion by using the asymmetric key to decrypt the second data structure portion to produce the second information, the second information being obtained from the second data structure portion without use of the symmetric key.

28. The method of embodiment 27, wherein the first information is obtained from the first data structure portion without use of the asymmetric key.

29. The method of any of embodiments 27-28, wherein the second information is obtained from the second data structure portion without use of the symmetric key.

30. The method of any of embodiments 19-29, further comprising: determining the first cryptographic scheme for the first information by determining a symmetric cryptographic scheme for extracting data from the first data structure portion; determining the second cryptographic scheme for the second information by determining an asymmetric cryptographic scheme for extracting data from the second data structure portion; obtaining the first information from the first data structure portion by using the symmetric cryptographic scheme to decrypt the first data structure portion to produce the first information; and obtaining the second information from the second data structure portion by using the asymmetric cryptographic scheme to decrypt the second data structure portion to produce the second information.

31. The method of embodiment 30, wherein the first information is obtained from the first data structure portion without use of the asymmetric cryptographic scheme.

32. The method of any of embodiments 30-31, wherein the second information is obtained from the second data structure portion without use of the symmetric cryptographic scheme.

33. The method of any of embodiments 19-32, wherein the first cryptographic scheme comprises use of a first cryptographic key associated with a first entity, and wherein the second cryptographic scheme comprises use of a second cryptographic key associated with a second entity, the second cryptographic key being different from the first cryptographic key.

34. The method of any of embodiments 19-33, wherein the data structure comprises the first and second data structure portions in a body of the data structure.

35. The method of any of embodiments 19-34, wherein the first information is obtained from the first data structure portion without use of the second cryptographic scheme.

36. The method of any of embodiments 19-35, wherein the second information is obtained from the second data structure portion without use of the first cryptographic scheme.

37. A tangible, non-transitory, machine-readable medium storing instructions that when executed by a data processing apparatus cause the data processing apparatus to perform operations comprising those of any of embodiments 1-36.

38. A system comprising: one or more processors; and memory storing instructions that when executed by the processors cause the processors to effectuate operations comprising those of any of embodiments 1-36.

What is claimed is:

1. A method of providing a data structure with different cryptographic keys for different body portions of the data structure, the method being implemented by a computer system that comprises one or more processors executing computer program instructions that, when executed, perform the method, the method comprising:
   providing content items to a neural network to cause the neural network to predict new information related to information in the content items;
   providing one or more target output indications as reference feedback to the neural network to cause the neural network to assess the predicted new information against the one or more target output indications, the neural network updating one or more portions of the neural network based on the neural network's assessment of the predicted new information;
   providing first information to the neural network to cause the neural network to predict second information related to the first information;
   responsive to the neural network predicting the second information, performing the following operations to create a data structure comprising (i) a header (ii) a body in which the first and second information are to be represented as first and second data structure portions:
      encrypting the first information with a cryptographic key to generate a first data structure portion, the first data structure portion being generated using the cryptographic key and without using another cryptographic key, and at least one of the cryptographic key or the other cryptographic key being associated with a first user;
      encrypting the second information with the other cryptographic key to generate a second data structure portion, the second data structure portion being generated using the other cryptographic key and without using the cryptographic key; and
      creating the data structure comprising the first and second data structure portions; and
   providing the data structure to a user device external to the computer system,
   wherein the data structure is configured such that (i) the first data structure portion is to be decrypted using a first cryptographic key and (ii) the second data structure portion is to be decrypted using a second cryptographic key different from the first cryptographic key, and
   wherein the data structure is configured such that (i) the first information is to be obtained from the first data structure portion based on decryption of the first data structure portion by the user device using the first cryptographic key, the user device obtaining the first information from the first data structure portion using the first cryptographic key and without using the second cryptographic key, and (ii) the second information is to obtained from the second data structure portion based on decryption of the second data structure portion by the user device using the second cryptographic key, the user device obtaining the second information from the second data structure portion using the second cryptographic key and without using the first cryptographic key.

2. The method of claim 1, wherein the data structure comprises a file, and a body of the file comprises the first and second data structure portions.

3. The method of claim 1, wherein the data structure comprises a linked list, array, or record, and a body of the linked list, array, or record comprises the first and second data structure portions.

4. The method of claim 1, wherein the first cryptographic key is associated with the first user.

5. The method of claim 4, wherein the second cryptographic key is not associated with the first user.

6. The method of claim 1, wherein the first cryptographic key is an asymmetric key, and the second cryptographic key is a symmetric key.

7. The method of claim 1, wherein the first cryptographic key is a symmetric key, and the second cryptographic key is an asymmetric key.

8. The method of claim 1, wherein the content items comprise action items, events, or conversations.

9. The method of claim 1, wherein the content items comprise information associated with individuals, wherein the first information comprises identifying information associated with one or more individuals, and wherein the second information predicted by the neural network comprises preference information associated with the one or more individuals.

10. A system comprising:
a computer system comprising one or more processors programmed with computer program instructions that, when executed, cause the computer system to:
provide content items to a neural network to cause the neural network to predict new information related to information in the content items;
provide one or more target output indications as reference feedback to the neural network to cause the neural network to assess the predicted new information against the one or more target output indications, the neural network updating one or more portions of the neural network based on the neural network's assessment of the predicted new information;
provide first information to the neural network to cause the neural network to predict second information related to the first information;
responsive to the neural network predicting the second information, performing the following operations to create a data structure comprising (i) a header (ii) a body in which the first and second information are to be represented as first and second data structure portions:
encrypting the first information with a cryptographic key to generate a first data structure portion, the first data structure portion being generated using the cryptographic key and without using another cryptographic key, and at least one of the cryptographic key or the other cryptographic key being associated with a first user;
encrypting the second information with the other cryptographic key to generate a second data structure portion, the second data structure portion being generated using the other cryptographic key and without using the cryptographic key; and
creating the data structure comprising the first and second data structure portions; and
provide the data structure to a user device external to the computer system,
wherein the data structure is configured such that (i) the first data structure portion is to be decrypted using a first cryptographic key and (ii) the second data structure portion is to be decrypted using a second cryptographic key different from the first cryptographic key, and
wherein the data structure is configured such that (i) the first information is to be obtained from the first data structure portion based on decryption of the first data structure portion by the user device using the first cryptographic key, the user device obtaining the first information from the first data structure portion using the first cryptographic key and without using the second cryptographic key, and (ii) the second information is to obtained from the second data structure portion based on decryption of the second data structure portion by the user device using the second cryptographic key, the user device obtaining the second information from the second data structure portion using the second cryptographic key and without using the first cryptographic key.

11. The system of claim 10, wherein the data structure comprises a file, and the file comprises the first and second data structure portions.

12. The system of claim 10, wherein the data structure comprises a linked list, array, or record, and the linked list, array, or record comprises the first and second data structure portions.

13. The system of claim 10, wherein the first cryptographic key is associated with the first user.

14. The system of claim 13, wherein the second cryptographic key is not associated with the first user.

15. The system of claim 10, wherein the first cryptographic key is an asymmetric key, and the second cryptographic key is a symmetric key.

16. The system of claim 10, wherein the first cryptographic key is a symmetric key, and the second cryptographic key is an asymmetric key.

17. The system of claim 10, wherein the content items comprise action items, events, or conversations.

18. The system of claim 10, wherein the content items comprise information associated with individuals, wherein the first information comprises identifying information associated with one or more individuals, and wherein the second information predicted by the neural network comprises preference information associated with the one or more individuals.

19. A non-transitory computer-readable medium storing instructions that, when executed by one or more processors, cause the one or more processors to perform operations comprising:
providing content items to a neural network to cause the neural network to predict new information related to information in the content items;
providing one or more target output indications as reference feedback to the neural network to cause the neural network to assess the predicted new information against the one or more target output indications, the neural network updating one or more portions of the neural network based on the neural network's assessment of the predicted new information;
providing first information to the neural network to cause the neural network to predict second information related to the first information;
responsive to the neural network predicting the second information, performing the following operations to create a data structure comprising (i) a header (ii) a body in which the first and second information are to be represented as first and second data structure portions:

encrypting the first information with a cryptographic key to generate a first data structure portion, the first data structure portion being generated using the cryptographic key and without using another cryptographic key, and at least one of the cryptographic key or the other cryptographic key being associated with a first user;

encrypting the second information with the other cryptographic key to generate a second data structure portion, the second data structure portion being generated using the other cryptographic key and without using the cryptographic key; and creating the data structure comprising the first and second data structure portions; and providing the data structure to a user device external to the computer system, wherein the data structure is configured such that (i) the first data structure portion is to be decrypted using a first cryptographic key and (ii) the second data structure portion is to be decrypted using a second cryptographic key different from the first cryptographic key, and wherein the data structure is configured such that (i) the first information is to be obtained from the first data structure portion based on decryption of the first data structure portion by the user device using the first cryptographic key, the user device obtaining the first information from the first data structure portion using the first cryptographic key and without using the second cryptographic key, and (ii) the second information is to obtained from the second data structure portion based on decryption of the second data structure portion by the user device using the second cryptographic key, the user device obtaining the second information from the second data structure portion using the second cryptographic key and without using the first cryptographic key.

20. The method of claim 19, wherein the data structure comprises a file, and the file comprises the first and second data structure portions.

* * * * *